(12) United States Patent
Ding et al.

(10) Patent No.: US 12,400,439 B2
(45) Date of Patent: Aug. 26, 2025

(54) TABLE RECOGNITION METHOD AND APPARATUS AND NON-TRANSITORY COMPUTER-READABLE MEDIUM

(71) Applicants: Lei Ding, Beijing (CN); Bin Dong, Beijing (CN); Shanshan Jiang, Beijing (CN); Jiashi Zhang, Beijing (CN); Yongwei Zhang, Beijing (CN)

(72) Inventors: Lei Ding, Beijing (CN); Bin Dong, Beijing (CN); Shanshan Jiang, Beijing (CN); Jiashi Zhang, Beijing (CN); Yongwei Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 319 days.

(21) Appl. No.: 18/165,459

(22) Filed: Feb. 7, 2023

(65) Prior Publication Data
US 2023/0290130 A1    Sep. 14, 2023

(30) Foreign Application Priority Data
Mar. 8, 2022   (CN) .......................... 202210220042.0

(51) Int. Cl.
*G06V 10/80* (2022.01)
*G06V 10/77* (2022.01)
*G06V 10/82* (2022.01)
*G06V 30/18* (2022.01)
*G06V 30/413* (2022.01)
*G06V 30/414* (2022.01)

(52) U.S. Cl.
CPC ........ *G06V 10/806* (2022.01); *G06V 10/7715* (2022.01); *G06V 10/82* (2022.01); *G06V 30/18162* (2022.01); *G06V 30/413* (2022.01); *G06V 30/414* (2022.01)

(58) Field of Classification Search
CPC .. G06V 10/806; G06V 10/7715; G06V 10/82; G06V 30/18162; G06V 30/414; G06V 30/413
See application file for complete search history.

(56) References Cited

U.S. PATENT DOCUMENTS

2021/0390294 A1* 12/2021 Huang ............. G06V 30/18048

* cited by examiner

*Primary Examiner* — David Perlman
(74) *Attorney, Agent, or Firm* — IPUSA, PLLC

(57) ABSTRACT

Disclosed are a table recognition method and apparatus. The table recognition method includes steps of obtaining an image vision feature and a character content feature of a table image; fusing the image vision feature and the character content feature of the table image to acquire a first fusion feature, and carrying out recognition based on the first fusion feature to acquire a table structure; and performing, based on the table structure, character recognition on the table image to acquire table character contents.

11 Claims, 6 Drawing Sheets

TABLE RECOGNITION METHOD AND APPARATUS AND NON-TRANSITORY COMPUTER-READABLE MEDIUM

BACKGROUND OF THE DISCLOSURE

1. Field of the Disclosure

The present disclosure relates to the field of image processing and character recognition, and specifically, a table recognition method and apparatus as well as a non-transitory computer-readable medium.

2. Description of the Related Art

A table is a type of data format in a document, that contains rich information. However, many tables are scanned or photographed into a picture (or image) format during data processing, that loses the structured information for a computer. As such, table recognition becomes an important technique for current document understanding. By using a better table recognition technique, an intelligent product can accurately understand document content information and provide reliable services.

The goal of table recognition is to recognize the contents of a table on the basis of the image of the table. Particularly, the table recognition includes the recognition of the structure of the table (embodied as the location region of each cell in the table) and the recognition of the character content in each cell of the table. The conventional technique mainly separates these two tasks, i.e., first recognizes the structure of the table, and then recognizes the content in each cell of the table; or first recognizes characters, and then recognizes the row and column relationship in the characters. However, such a solution in the prior art still has a shortcoming in the accuracy of table recognition. Therefore, there is an urgent need for a scheme that can improve the accuracy of table recognition.

SUMMARY OF THE DISCLOSURE

The present disclosure aims to provide a table recognition method and apparatus by which it is possible to improve the accuracy of table recognition.

According to a first aspect of the present disclosure, a table recognition method is provided that includes steps of obtaining an image vision feature and a character content feature of a table image; fusing the image vision feature and the character content feature of the table image to acquire a first fusion feature, and carrying out recognition based on the first fusion feature to acquire a table structure; and performing, based on the table structure, character recognition on the table image to acquire table character contents.

According to a second aspect of the present disclosure, a table recognition apparatus is provided that includes parts respectively configured to obtain an image vision feature and a character content feature of a table image; fuse the image vision feature and the character content feature of the table image to acquire a first fusion feature, and carry out recognition based on the first fusion feature to acquire a table structure; and perform, based on the table structure, character recognition on the table image to acquire table character contents.

According to a third aspect of the present disclosure, a non-transitory computer-readable medium is provided that stores computer-executable instructions (i.e., a computer-executable program) for execution by a computer having a processor(s). The computer-executable instructions cause, when executed by the processor(s), the processor(s) to conduct the table recognition method according to the first aspect of the present disclosure.

According to a fourth aspect of the present disclosure, another table recognition apparatus is provided that includes a storage storing computer-executable instructions; and a processor(s) coupled to the storage. The computer-executable instructions cause, when executed by the processor(s), the processor(s) to perform the table recognition method according to the first aspect of the present disclosure.

Compared with the prior art, the table recognition method and apparatus according to the embodiments of the present disclosure may cause one of the two tasks of table structure recognition and character content recognition to utilize the feature information of another, thereby being capable of improving the recognition accuracy of table structure and character contents as well as the effect of table recognition.

DETAILED DESCRIPTION OF THE PREFERRED EMBODIMENTS

In order to let a person skilled in the art better understand the present disclosure, hereinafter, the embodiments of the present disclosure are concretely described with reference to the drawings. However, it should be noted that the same symbols, that are in the specification and the drawings, stand for constituent elements having basically the same function and structure, and the repetition of the explanations to the constituent elements is omitted.

At present, the existing method of recognizing a table is mainly to make the recognition of the structure of the table and the recognition of the character contents in the table serve as two tasks that are mutually independent, and perform the two tasks. However, this kind of method disconnects the information exchange between the two tasks. That is, one task cannot utilize the information of another task. This may encounter a problem that cannot be overcome, and generate an adverse effect on the accuracy of table recognition.

For example, when carrying out table structure recognition with respect to the table image obtained by scanning the flowing table (Table 1), it is difficult to accurately recognize the blank region in a cell (also called a table cell). Particularly, the blank region in a combined cell of a table header such as "Fiscal Year" in Table 1 is usually difficult to be accurately recognized because there does not exit a character content feature in the blank region of the combined cell.

TABLE 1

| Fiscal Year | | | | |
|---|---|---|---|---|
| 2018 | 2017 | 2016 | 2015 | 2014 |
| 9021 | 9325 | 8523 | 7511 | 6854 |
| 10 | 9 | 9 | 7 | 6 |
| ... | ... | ... | ... | ... |

Additionally, in the process of recognizing the character content in the combined cell, because there is no data of the same row or column in the table structure, the character recognition usually cannot distinguish "10" from "IO", for example.

In light of the problem that there is no information exchange between the two tasks in the existing table recognition method so that an adverse effect may be generated on the accuracy of table recognition, a multi-modal information based table recognition method and apparatus are proposed in the embodiments of the present disclosure. By utilizing such a table recognition method and apparatus, for two tasks, i.e., table structure recognition and character content recognition thereof, it is possible to make one task use the information of another task, thereby being able to improve the recognition effect.

First Embodiment

In this embodiment, a method of recognizing a table is provided.

Figure 1:
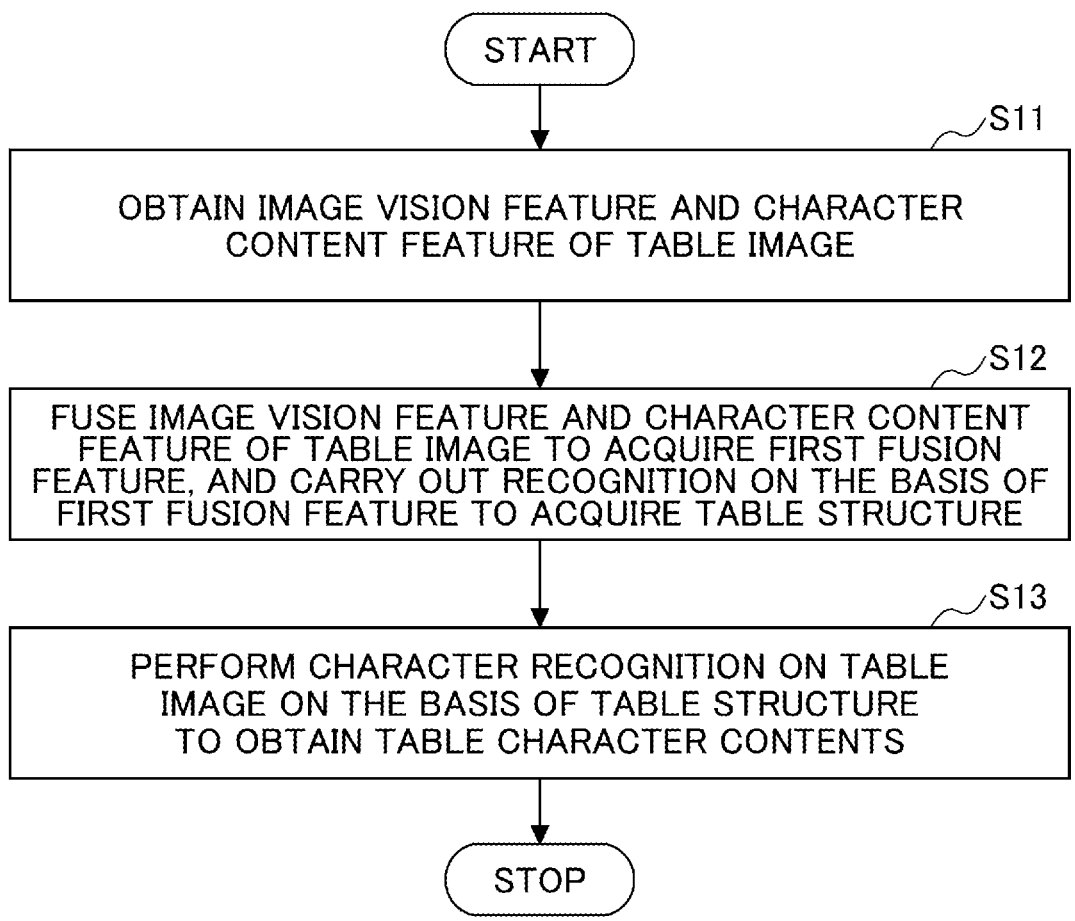
FIG. 1 is a flowchart of a table recognition method according to a first embodiment of the present disclosure.

FIG. 1 is a flowchart of a table recognition method according to this embodiment. As shown in FIG. 1, the table recognition method is inclusive of STEPS S11 to S13.

STEP S11 is obtaining the image vision feature and the character content feature of a table image (also called a table picture in an image format).

Here, feature extraction may be performed on the table image to respectively obtain the image vision feature and the character content feature of the table image.

Specifically, it is possible to generate a first feature matrix whose dimension is the same as the dimension of the table image to serve as the image vision feature of the table image; recognize character contents and the location regions of the character contents (i.e., the location regions where the character contents are located) in the table image to generate a vector representation corresponding to the character contents; and construct a zero matrix (all of whose entries (elements) are zero) whose dimension is the same as the dimension of the table image, and fill, based on the location regions of the character contents, the vector representation corresponding to the character contents into the zero matrix, so as to acquire a second feature matrix serving as the character content feature of the table image.

For example, a neural network model can be adopted to recognize the image vision feature of the table image. Specifically, the table image is input into a pre-trained neural network model so that a first feature matrix whose dimension is the same as the dimension of the table image is acquired to serve as the image vision feature of the table image. Here, the first feature matrix may be a x*y matrix (x and y are the numbers of pixels in the length and width directions of the table image, respectively). Each element in the first feature matrix may be a z-dimensional vector (z is greater than or equal to 1).

Again, for example, an optical character recognition (OCR) tool may be utilized to recognize the character contents and their corresponding location regions in the table image. Next, a zero matrix whose dimension is the same as the dimension of the table image is built, and the recognized character content in each location region is converted into a z-dimensional vector representation. Subsequently, the z-dimensional vector representations are filled, based on the location regions where the character contents are located, into the corresponding positions in the zero matrix, so as to acquire the character content feature of the table image.

STEP S12 is fusing the image vision feature and the character content feature of the table image to acquire a first fusion feature, and carrying out recognition on the basis of the first fusion feature to acquire a table structure.

Here, when conducting table structure recognition, the image vision feature and the character content feature of the table image are combined, thereby being capable of improving the accuracy of table structure recognition.

Specifically, there are many approaches of feature fusion. In an example, the image vision feature and the character content feature of the table image may be input into a fully-connected layer of a neural network model to obtain the first fusion feature output from the fully-connected layer. In another example, it is possible to perform stitching on the image vision feature and the character contend feature of the table image to acquire the first fusion feature. In still another example, weighted summation may be conducted with respect to the image vision feature and the character content feature of the table image to acquire the first fusion feature.

Here it should be noted that the present disclosure is not limited to the approaches of feature fusion; that is, any approach that is able to fuse the above two features of the table image can be used in the present disclosure.

After acquiring the first fusion feature, it is possible to carry out table structure recognition on the basis of the first fusion feature. For example, the location region of each cell in the table image can be detected according to the first fusion feature, and the table structure of the table image can be recognized based on the location region of each cell in the table image.

Specifically, the first fusion feature may be input into a pre-trained neural network model for table structure recognition, and the neural network model may output a result serving as the information related to the cells and their location regions in the table image.

In general, the structure of a table may be represented by the information relating to the cells and their location regions in the table. Taking a rectangular cell as an example, the location region of the rectangular cell may be represented by the horizontal and vertical coordinates of the upper left corner and the lower right corner of the rectangular cell. Of course, it is also possible to use the horizontal and vertical coordinates of the four corners of the rectangular cell to represent its location region.

STEP S13 is performing character recognition on the table image on the basis of the table structure to obtain table character contents.

Here, after acquiring the table structure, it is possible to crop, based on the location regions of the cells in the table structure, images corresponding to the location regions from the table image, and conduct character recognition with respect to the extracted images to acquire the character content of each cell, so as to obtain the table character contents.

By utilizing the steps in FIG. 1, when carrying out table structure recognition, both the image vision feature and the character content feature of the table image are considered. In particular, by introducing the character content feature, it is possible to improve the accuracy of table structure recognition, thereby being able to ameliorate the accuracy of table recognition.

Figure 2:
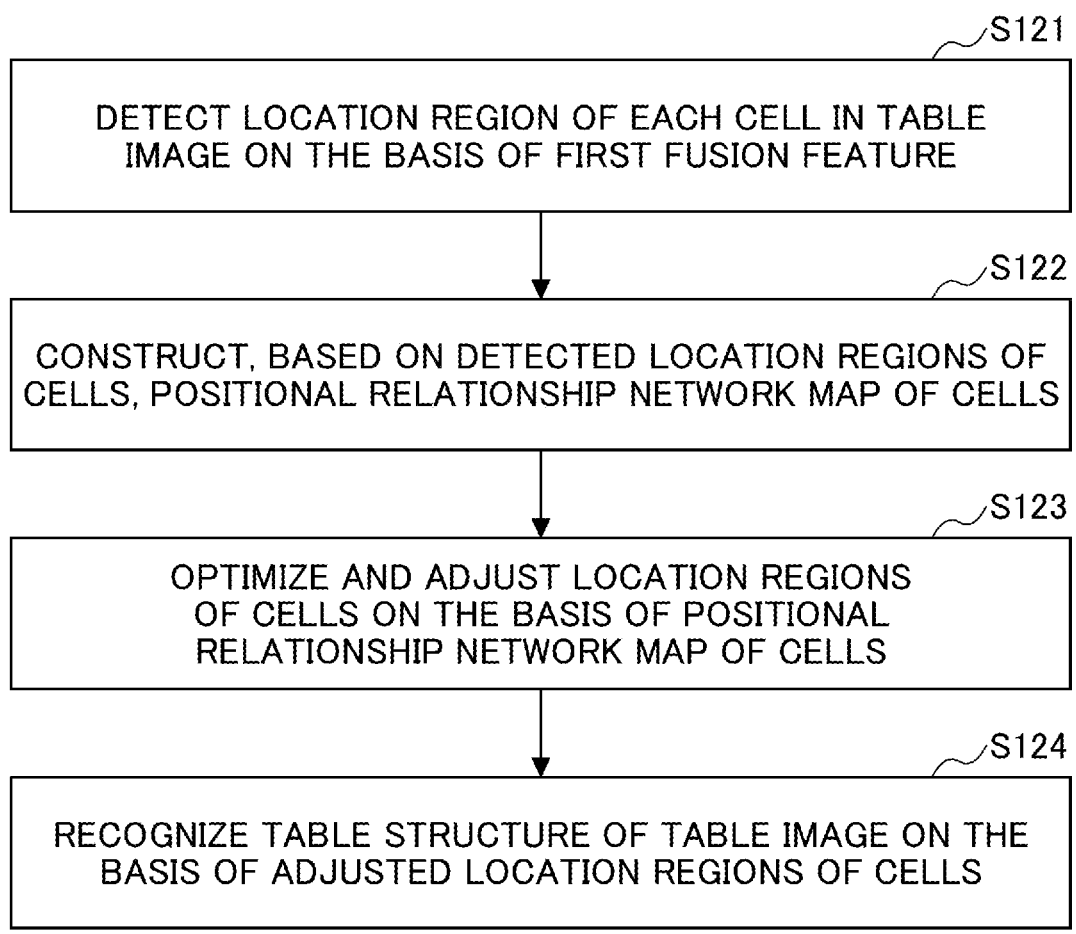
FIG. 2 is a flowchart of table structure recognition in the first embodiment.

In order to further improve the accuracy of table structure recognition, during the process of carrying out recognition on the basis of the first fusion feature to acquire the table structure in the STEP S12 of FIG. 1, it is also possible to optimize the cell detection result as illustrated in FIG. 2.

FIG. 2 is a flowchart of table structure recognition in this embodiment. As presented in FIG. 2, STEPS S121 to S124 are included.

STEP S121 is detecting the location region of each cell in the table image on the basis of the first fusion feature.

Here, the first fusion feature may be input into a pre-trained neural network model for table structure recognition, and the neural network model may output a result serving as the information related to the cells and their location region in the table image.

Figure 3:
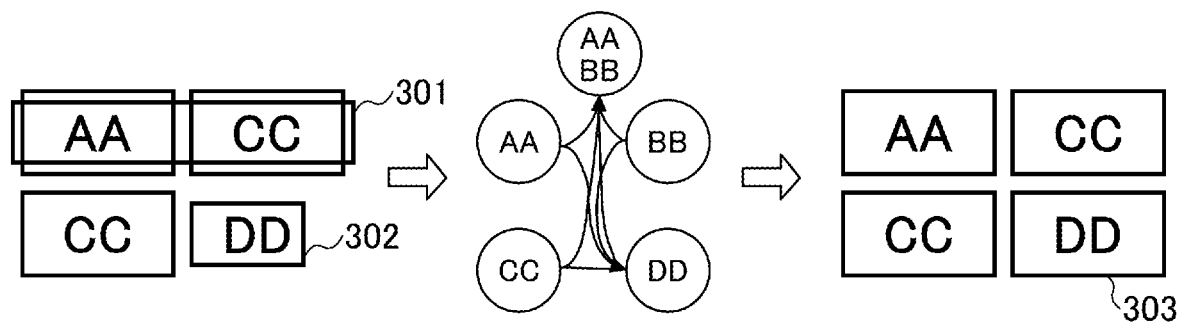
FIG. 3 illustrates an example of table cell detection result optimization in the first embodiment.

FIG. 3 illustrates an example of cell detection result optimization in this embodiment.

In FIG. 3, it is assumed that five cells are recognized. The location regions of these five cells are represented by five rectangular frames on the left side of this drawing, respectively. Here, for the sake of convenience, "AABB" is used to represent the rectangular frame corresponding to the larger cell 301, and "AA", "BB", "CC", and "DD" are used to indicate the other rectangular frames corresponding to the smaller cells. However, in the actual table of the table image, there does not exist the cell 301. In addition, the size of the cell 302 indicated by "DD" should be the same as the size of any one of the cells indicated by "AA", "BB", and "CC". That is, there may be some errors in the table structure recognition result. For example, the cell 301 that does not exist is introduced, and the location region of the cell 302 is incorrect.

STEP S122 is constructing, based on the detected location regions of the cells, a positional relationship network map of the cells.

Here, the positional relationship of the cells includes belonging to the same row and belonging to the same column. Belonging to the same row means that two ore more cells belong to the same row, and belonging to the same column means that two or more cells belong to the same column. Specifically, it is possible to judge, according to a pre-determined rule, whether two or more cells belong to the same column or row.

For example, if the mid-value of the abscissas (horizontal coordinates) of a first cell is between the maximum value and the minimum value of the abscissas of a second cell, then it can be judged that the first cell and the second cell belong to the same column; otherwise, it can be judged that the first cell and the second cell do not belong to the same column.

Furthermore, if the mid-value of the ordinates (vertical coordinates) of a first cell is between the maximum value and the minimum value of the ordinates of a second cell, then the first cell and the second cell can be determined as belonging to the same row; otherwise, the first cell and the second cell can be determined as not belonging to the same row.

Again, for example, if the ratio of the length of the overlapping portion of the horizontal side of a first cell and the horizontal side of a second cell to the length of the horizontal side of the first cell or the second cell reaches a first pre-determined threshold value, then it is possible to judge that the first cell and the second cell belong to the same column; otherwise, it can be judged that the first cell and the second do not belonging to the same column.

Moreover, if the ratio of the height of the overlapping portion of the vertical side of a first cell and the vertical side of a second cell to the height of the vertical side of the first cell or the second cell reaches a second pre-determined threshold value, then the first cell and the second cell can be judged as belonging to the same row; otherwise, it is possible to determine that the first cell and the second cell do not belong to the same row.

To sum up, in this step, it is possible to determine, based on the detected location regions of the cells, the positional relationship of the cells according to the predetermined rule. The positional relationship of the cells includes belonging to the same row and belonging to the same column. Subsequently, on the basis of the positional relationship of the cells, the positional relationship network map of the cells can be constructed. The positional relationship network map of the cells contains a plurality of points, each of which corresponds to one cell. The relationship of the points can be generated on the basis of the relationship of the cells. An example of the positional relationship network map of the cells is given in the middle of FIG. 3.

STEP S123 is optimizing and adjusting the location regions of the cells on the basis of the positional relationship network map of the cells.

Here, the positional relationship network map of the cells may be input into a pre-trained multi-task learning model, and the pre-trained multi-task learning model may output a result serving as the location regions of the cells after optimization and adjustment.

The pre-trained multi-task learning model may include a classification task for determining whether a cell is deleted and a coordinate regression task for adjusting the position coordinates of a cell. The classification task is to classify whether a candidate is a cell. The coordinate regression task is to perform regression processing on four coordinates x1, x2, y1, and y2 of a cell to modify the four coordinates (i.e., the coordinate regression task is to perform adjustment on position coordinates of the cell). Here, the four coordinates x1, x2, y1, and y2 refer to the minimum value of the abscissas, the maximum value of the abscissas, the minimum value of the ordinates, and the maximum value of the ordinates of the cell, respectively.

STEP S124 is recognizing the table structure of the table image on the basis of the adjusted location regions of the cells.

Here, after the processing of STEP S123, a more accurate cell detection result can be acquired so that it is possible to utilize a simple rule such as the pre-determined rule in STEP S122 to recognize the table structure of the table image.

For example, on the right side of FIG. 3 is a table structure acquired after carrying out optimization and adjustment with respect to the five cells on the left side of FIG. 3. In the acquired table structure, the cell 301 on the left side of FIG. 3 is deleted, and a new location region 303 is obtained by adjusting the size of the cell indicated by "DD" on the left side of FIG. 3.

By making use of the steps in FIG. 2, it is possible to utilize the positional relationship of the cells to perform optimization and adjustment on the cell detection result to make the cell detection result more accurate, thereby being capable of improving the accuracy of table recognition.

In order to further ameliorate the recognition accuracy of the character content in each cell. When performing character content recognition on each cell in STEP S13 of FIG. 1, the features of the peripheral cells of the same cell can be considered as presented in FIG. 4.

Figure 4:
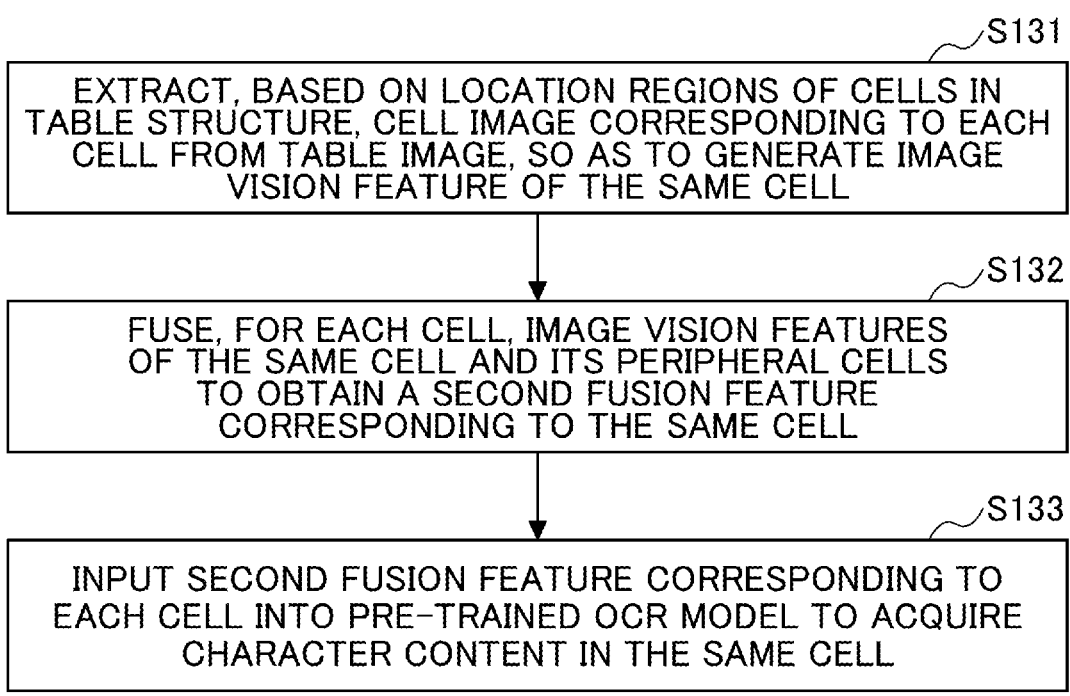
FIG. 4 is a flowchart of character content recognition in the first embodiment.

FIG. 4 is a flowchart of character content recognition in the embodiment. As shown in FIG. 4, STEPS S131 to S133 are included.

STEP S131 is extracting, based on the location regions of the cells in the table structure, a cell image corresponding to each cell from the table image, so as to generate the image vision feature of the same cell.

Here, on the basis of the table result (i.e., the table structure) acquired in STEP S12 of FIG. 1, the location region of each cell can be determined, so that it is possible to crop, based on the location region of each cell, an image (i.e., the cell image) corresponding to the location region of the same cell from the table image, and then, generate, based on the cell image corresponding to same cell, the image vision feature of the same cell.

For example, it is possible to acquire the image vision feature of each cell by means of neural network model based recognition. That is, the cell images may be input into a pre-trained neural network model, and the pre-trained neural network model may output a feature matrix of the cell images, serving as the image vision features of the cell images.

STEP S132 is fusing, for each cell, the image vision feature of the same cell and the image vision features of the peripheral cells of the same cell to obtain a second fusion feature corresponding to the same cell. The peripheral cells include the cells that belong to the row and/or column of the same cell.

Here, it is possible to perform, for each cell, fusion on the image vision feature of the same cell and the image vision features of the peripheral cells of the same cell, so as to acquire the second fusion feature corresponding to the same cell. The fusion may be achieved by neural network full-connected layer based fusion, stitching, or weighted summation as set forth above; however, the present disclosure is not limited to these.

Moreover, the peripheral cells of each cell may be the cells located in the row and/or column of the same cell. For example, the peripheral cells of the same cell may include all the cells or a part of all the cells belonging to the row of the same cell and/or all the cells or a part of all the cells belonging to the column of the same cell. The part of all the cells may be the cells among all the cells, the distances between which and the same cell are less than a pre-determined threshold value.

STEP S133 is inputting the second fusion feature corresponding to each cell into a pre-trained OCR model to acquire the character content in the same cell.

After obtaining the second fusion features of the cells, it is possible to utilize a pre-trained OCR model to carry out recognition, so as to obtain the character contents of the cells. Here, the OCR model may adopt a network model such as a CRNN (Convolutional Recurrent Neural Network) and so on.

By making use of the steps in FIG. 4, when conducting character content recognition, the features of the peripheral cells of each cell can be considered, so that it is possible to improve the accuracy of character recognition. For example, regarding the characters "10" and "IO" that are usually difficult to be distinguished, the recognition accuracy of them can be dramatically ameliorated after these steps are adopted.

Therefore, it is obvious that in this embodiment, by fusing the image vision feature and the character content feature of the table image, the accuracy of table structure recognition can be improved, and by taking the positional relationship of the cells into account, the accuracy of table structure recognition can be further improved. Furthermore, during the process of character recognition in this embodiment, the features of the peripheral cells of each cell can be considered, so that it is also possible to ameliorate the accuracy of character content recognition.

Second Embodiment

In this embodiment, an apparatus for table recognition is provided that can implement the table recognition method in accordance with to the first embodiment.

Figure 5:
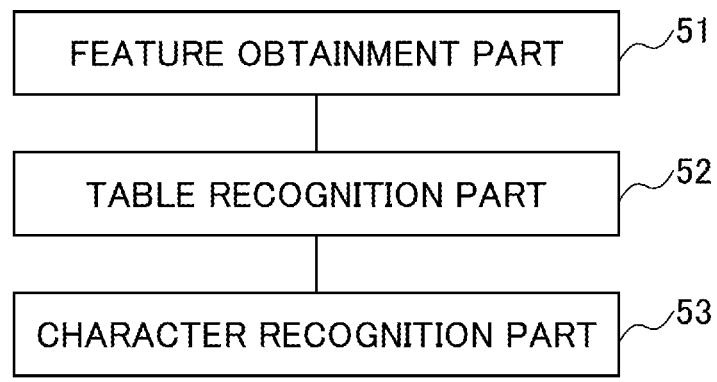
FIG. 5 is a block diagram of a first structure of a table recognition apparatus in accordance with a second embodiment of the present disclosure.

FIG. 5 is a block diagram of a first structure of a table recognition apparatus according to this embodiment.

As presented in FIG. 5, the table recognition apparatus is inclusive of a feature obtainment part 51, a table recognition part 52, and a character recognition part 53 respectively configured to perform STEPS S11 to S13 in FIG. 1.

Of course, the table recognition apparatus may also include other parts as needed. Also, it should be pointed out that for the reason that STEPS S11 to S13 of FIG. 1 have been minutely described in the first embodiment, the details of them are omitted here.

By utilizing such a table recognition apparatus, it is possible to improve the accuracy of table recognition.

Figure 6:
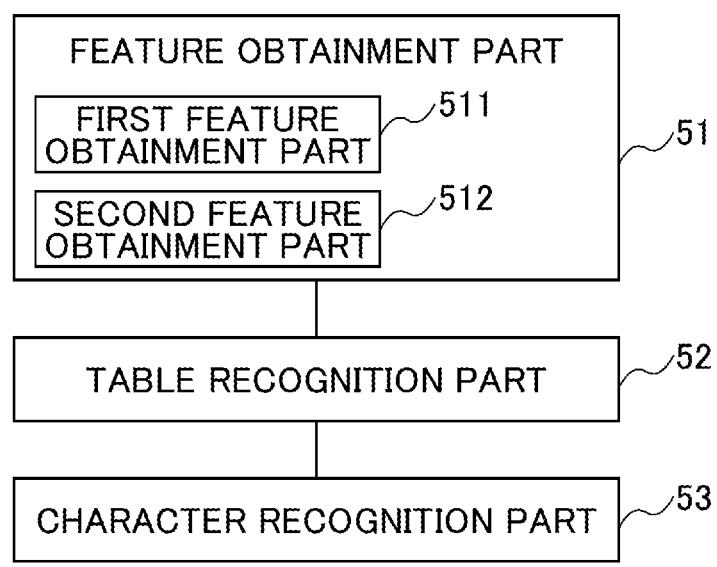
FIG. 6 is a block diagram of a second structure of the table recognition apparatus in the second embodiment.

Optionally, the feature obtainment part 51 of FIG. 5 may contain a first feature obtainment part 511 and a second feature obtainment part 512 as illustrated in FIG. 6.

FIG. 6 is a block diagram of a second structure of the table recognition apparatus in this embodiment.

The first feature obtainment part 511 and the second feature obtainment part 512 presented in FIG. 6 are configured to acquire the image vision feature and the character content feature of the table image in STEP S11 of FIG. 1, respectively.

Here, it should be noted that because the approaches of obtaining the image vision feature and the character content feature of the table image in STEP S11 of FIG. 1 have been concretely described in the first embodiment, their details are omitted here.

Figure 7:
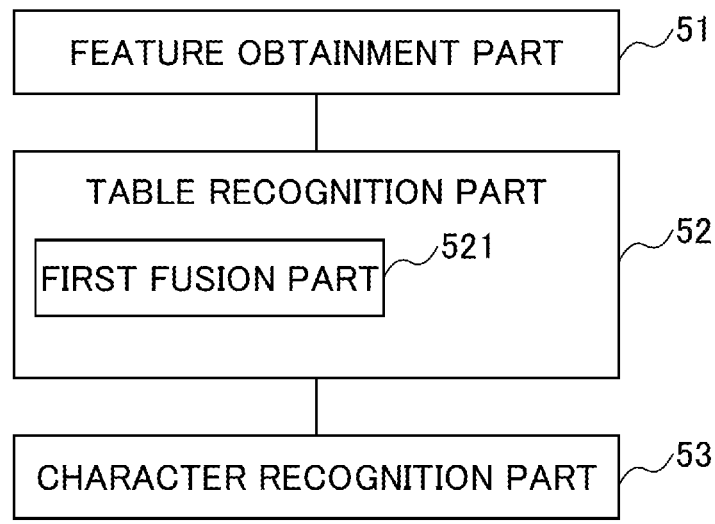
FIG. 7 is a block diagram of a third structure of the table recognition apparatus in the second embodiment.

Optionally, the table recognition part 52 of FIG. 5 may include a first fusion part 521 as shown in FIG. 7.

FIG. 7 is a block diagram of a third structure of the table recognition apparatus in this embodiment.

The first fusion part 521 shown in FIG. 7 is configured to acquire the first fusion feature of the table image in STEP S12 of FIG. 1, i.e., carry out STEP S12 in FIG. 1.

Here, it should be pointed out that for the reason that the approaches of acquiring the first fusion feature of the table image in STEP S12 of FIG. 1 have been minutely described in the first embodiment, the details of them are omitted here.

Figure 8:
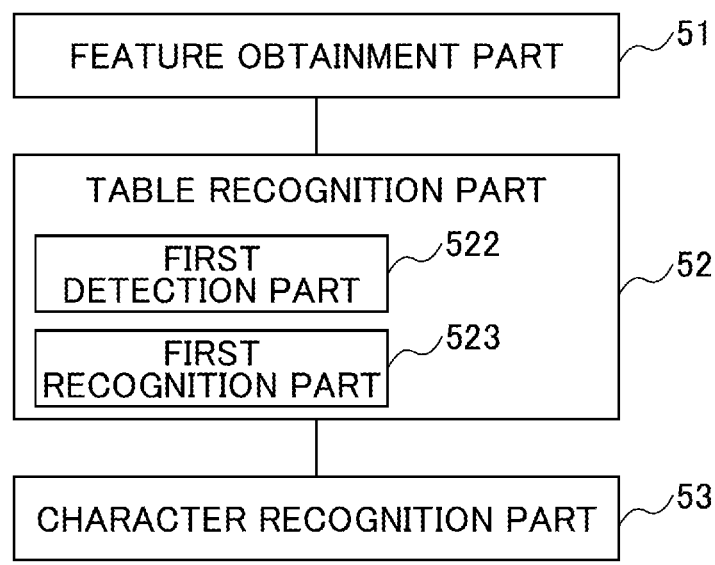
FIG. 8 is a block diagram of a fourth structure of the table recognition apparatus in the second embodiment.

Optionally, the table recognition part 52 of FIG. 5 may include a first detection part 522 and a first recognition part 523 as illustrated in FIG. 8.

FIG. 8 is a block diagram of a fourth structure of the table recognition apparatus in this embodiment.

In FIG. 8, the first detection part 522 is configured to detect the location region of each cell in the table image in STEP S121 of FIG. 2, i.e., perform STEP S121 in FIG. 2. The first recognition part 523 is configured to recognize the table structure of the table image on the basis of the location region of each cell in the table image. For example, the first recognition part 523 may execute STEP S124 in FIG. 2.

Additionally, the table recognition part 52 of FIG. 5 may further include a first optimization part (not shown in the drawings) that is configured to conduct STEPS S122 and S123 in FIG. 2.

Here, it should be noted that because the steps of FIG. 2 have been minutely described in the first embodiment, their details are omitted here.

Figure 9:
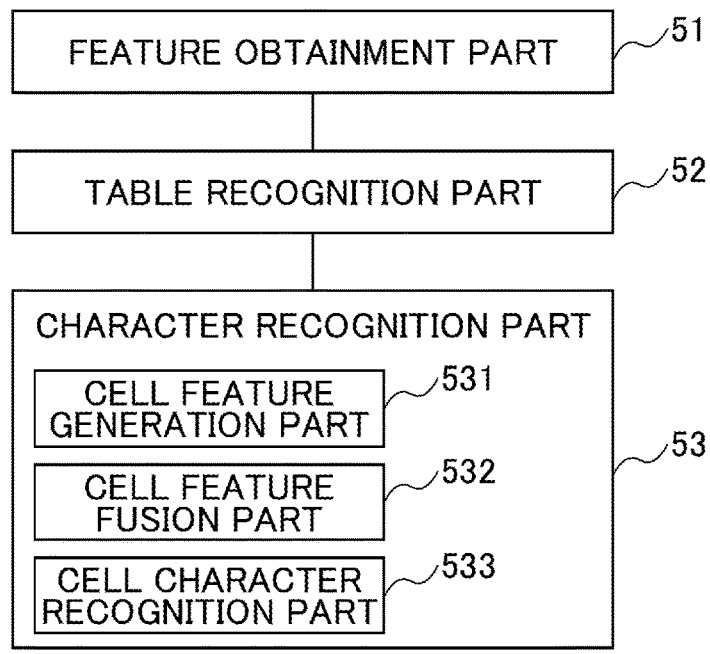
FIG. 9 is a block diagram of a fifth structure of the table recognition apparatus in the second embodiment.

Optionally, as illustrated in FIG. 9, the character recognition part 53 of FIG. 5 may contain a cell feature generation part 531, a cell feature fusion part 532, and a cell character recognition part 533.

FIG. 9 is a block diagram of a fifth structure of the table recognition apparatus in this embodiment.

In FIG. 9, the cell feature generation part 531, the cell feature fusion part 532, and the cell character recognition part 533 are configured to carry out STIES S131 to S133 in FIG. 4, respectively.

Here, it should be pointed out that for the reason that STEPS S131 to S133 of FIG. 4 have been concretely described in the first embodiment, the details of them are omitted here.

Third Embodiment

Another apparatus for table recognition is provided in this embodiment.

Figure 10:
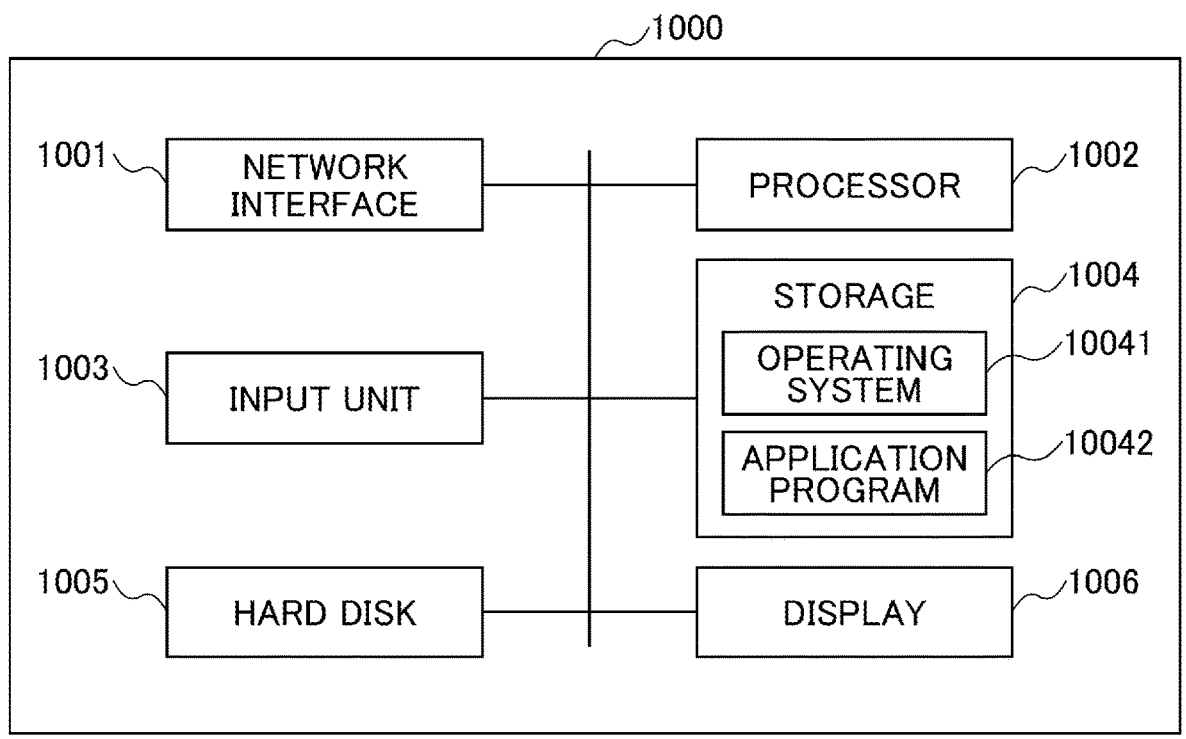
FIG. 10 is a block diagram of the structure of the table recognition apparatus according to a third embodiment of the present disclosure.

FIG. 10 is a block diagram of the structure of a table recognition apparatus 1000 according to this embodiment.

As presented in FIG. 10, the table recognition apparatus 1000 is inclusive of a network interface 1001, a processor 1002, an input unit 1003, a storage 1004 including an operating system 10041 and an application program 10042, a hard disk 1005, and a display 1006 which are connected by a bus.

The network interface 1001 may be configured to connect to a network such as the Internet, a local area network (LAN), or the like. The processor 1002 may be used to execute a computer program, for example, the application program 10042 stored in the storage 1004, so as to fulfill the table recognition method according to the first embodiment. The input unit 1003 may be configured to let a user input various instructions, that may be a keyboard or a touch panel, for instance. The storage 1004 may be utilized to store requisite computer programs and data as well as the intermediate results generated when the processor 1002 executes the application program 10042, for example. The hard disk 1005 may be employed to store any information or data necessary to achieve the table recognition method according to the first embodiments, for instance. The display 1006 may be used to display the results acquired when executing the application program 10042 by the processor 1002, for example.

Furthermore, a computer-executable program and a non-transitory computer-readable medium are further provided. The computer-executable program may cause a computer to perform the table recognition method according to the first embodiment. The non-transitory computer-readable medium may store computer-executable instructions (i.e., the computer-executable program) for execution by a computer involving a processor. The computer-executable instructions may cause, when executed by the processor, the processor to conduct the table recognition method in accordance with the first embodiment.

Moreover, the above embodiments are just exemplary ones, and the specific structure and operation of them may not be used for limiting the present disclosure.

In addition, the embodiments of the present disclosure may be implemented in any convenient form, for example, using dedicated hardware or a mixture of dedicated hardware and software. The embodiments of the present disclosure may be implemented as computer software executed by one or more networked processing apparatuses. The network may include any conventional terrestrial or wireless communications network, such as the Internet. The processing apparatuses may include any suitably programmed apparatuses such as a general-purpose computer, a personal digital assistant, a mobile telephone (such as a WAP or 3G, 4G, or 5G-compliant phone) and so on. Since the embodiments of the present disclosure may be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform may include any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 202210220042.0 filed on Mar. 8, 2022, the entire contents of which are hereby incorporated by reference.

What is claimed is:

1. A table recognition method comprising:
obtaining an image vision feature and a character content feature of a table image;
fusing the image vision feature and the character content feature of the table image to acquire a first fusion feature, and carrying out recognition based on the first fusion feature to acquire a table structure; and
performing, based on the table structure, character recognition on the table image to acquire table character contents, wherein
the obtaining includes
generating a first feature matrix serving as the image vision feature of the table image, the first feature matrix having a same dimension as the table image;

recognizing character contents and location regions of the character contents in the table image to generate a vector representation corresponding to the character contents; and constructing a zero matrix whose dimension is same as the table image, and filling, based on the location regions of the character contents, the vector representation corresponding to the character contents into the zero matrix to acquire a second feature matrix serving as the character content feature of the table image.

2. The table recognition method in accordance with claim 1, wherein, the fusing the image vision feature and the character content feature of the table image to acquire a first fusion feature includes inputting the image vision feature and the character content feature of the table image into a fully-connected layer of a neural network model to acquire the first fusion feature output from the fully-connected layer;

performing stitching on the image vision feature and the character content feature of the table image to acquire the first fusion feature; or conducting weighted summation with respect to the image vision feature and the character content feature of the table image to acquire the first fusion feature.

3. The table recognition method in accordance with claim 1, wherein, the carrying out recognition based on the first fusion feature to acquire a table structure includes detecting, based on the first fusion feature of the table image, a location region of each cell in the table image; and recognizing, based on the location region of each cell in the table image, the table structure.

4. The table recognition method in accordance with claim 3, wherein, before recognizing, based on the location region of each cell in the table image, the table structure, the carrying out recognition based on the first fusion feature to acquire a table structure further includes building, based on the location region of each cell in the table image, a positional relationship network map of cells; and optimizing and adjusting, based on the positional relationship network map of cells, the location region of each cell.

5. The table recognition method in accordance with claim 4, wherein, the optimizing and adjusting, based on the positional relationship network map of cells, the location region of each cell includes inputting the positional relationship network map of cells into a pre-trained multi-task learning model to acquire the location region of each cell after optimization and adjustment, and wherein, the pre-trained multi-task learning model contains a classification task configured to determine whether a cell is deleted; and a coordinate regression task configured to perform adjustment on position coordinates of a cell.

6. The table recognition method in accordance with claim 1, wherein, performing, based on the table structure, character recognition on the table image to acquire table character contents includes extracting, based on location regions of cells in the table structure, a cell image corresponding to each cell from the table image to generate an image vision feature of each cell;

fusing, for each cell, the image vision features of the cell and peripheral cells thereof to acquire a second fusion feature corresponding to the cell, the peripheral cells containing cells belonging to a row and/or a column of the cell; and inputting the second fusion feature corresponding to each cell into a pre-trained optical character recognition model to acquire the character content of the cell.

7. A non-transitory computer-readable medium having computer-executable instructions for execution by a processor, wherein, the computer-executable instructions cause, when executed by the processor, the processor to conduct the table recognition method in accordance with claim 1.

8. A table recognition apparatus comprising:

a processor; and a storage storing computer-executable instructions, coupled to the processor, wherein the computer-executable instructions cause, when executed by the processor, the processor to:

obtain an image vision feature and a character content feature of a table image;

fuse the image vision feature and the character content feature of the table image to acquire a first fusion feature, and conduct recognition based on the first fusion feature to acquire a table structure; and perform, based on the table structure, character recognition on the table image to acquire table character contents, and in obtaining the image vision feature and the character content feature of the table image, the processor is caused to:

generate a first feature matrix serving as the image vision feature of the table image, the first feature matrix having a same dimension as the table image:

recognize character contents and location regions of the character contents in the table image to generate a vector representation corresponding to the character contents; and construct a zero matrix whose dimension is same as the table image, and fill, based on the location regions of the character contents, the vector representation corresponding to the character contents into the zero matrix to acquire a second feature matrix serving as the character content feature of the table image.

9. The table recognition apparatus in accordance with claim 8, wherein the processor is further caused to:

input the image vision feature and the character content feature of the table image into a fully-connected layer of a neural network model to acquire the first fusion feature output from the fully-connected layer;

perform stitching on the image vision feature and the character content feature of the table image to acquire the first fusion feature; or conduct weighted summation with respect to the image vision feature and the character content feature of the table image to acquire the first fusion feature.

10. The table recognition apparatus in accordance with claim 8, wherein the processor is further caused to:

detect, based on the first fusion feature of the table image, a location region of each cell in the table image; and recognize, based on the location region of each cell in the table image, the table structure.

11. The table recognition apparatus in accordance with claim 8, wherein the processor is further caused to:

extract, based on location regions of cells in the table structure, a cell image corresponding to each cell from the table image to generate an image vision feature of each cell;

fuse, for each cell, the image vision features of the cell and peripheral cells thereof to acquire a second fusion feature corresponding to the cell, the peripheral cells containing cells belonging to a row and/or a column of the cell; and input the second fusion feature corresponding to each cell into a pre-trained optical character recognition model to acquire the character content of the cell.

* * * * *